(12) United States Patent  (10) Patent No.: US 7,717,341 B2
Gibson                     (45) Date of Patent:      May 18, 2010

(54) BAR CODE SCANNER HAVING AN ADAPTIVE THRESHOLD USING A FIRST DERIVATIVE AMPLITUDE

(75) Inventor: Gregory T. Gibson, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 624 days.

(21) Appl. No.: 11/796,276

(22) Filed: Apr. 26, 2007

(65) Prior Publication Data

US 2008/0265034 A1     Oct. 30, 2008

(51) Int. Cl.
*G02B 26/00*  (2006.01)
*G06K 7/10*   (2006.01)
*G06K 9/22*   (2006.01)
*G06K 19/06*  (2006.01)

(52) U.S. Cl. .................. 235/462.25; 235/454
(58) Field of Classification Search ............. 235/462.25, 235/462.35, 462.36, 462.45, 454
See application file for complete search history.

(56) References Cited

U.S. PATENT DOCUMENTS

| | | | |
|---|---|---|---|
| 4,000,397 A | 12/1976 | Hebert et al. | |
| 4,020,357 A | 4/1977 | Punis | |
| 4,091,379 A | 5/1978 | Wu et al. | |
| 4,158,435 A | 6/1979 | Nakanishi et al. | |
| 4,335,301 A | 6/1982 | Palmer et al. | |
| 4,528,444 A | 7/1985 | Hara et al. | |
| 4,740,675 A | 4/1988 | Brosnan et al. | |
| 4,749,879 A | 6/1988 | Peterson et al. | |
| 4,777,357 A | 10/1988 | Harada et al. | |
| 4,782,219 A | 11/1988 | Crater | |
| 4,798,943 A | 1/1989 | Cherry | |
| 4,933,538 A | 6/1990 | Heiman et al. | |
| 5,272,323 A | 12/1993 | Martino | |
| 5,302,813 A | 4/1994 | Goren | |
| 5,408,081 A | 4/1995 | Barkan | |
| 5,436,440 A | 7/1995 | Barkan | |
| 5,446,272 A | 8/1995 | Barkan | |
| 5,449,893 A | 9/1995 | Bridgelall et al. | |
| 5,463,211 A | 10/1995 | Arends et al. | |
| 5,475,208 A | 12/1995 | Marom | |
| 5,545,888 A | 8/1996 | Barkan et al. | |
| 5,557,094 A | 9/1996 | Barkan | |
| 5,581,072 A | 12/1996 | Bridgelall et al. | |
| 5,606,447 A | 2/1997 | Asada et al. | |
| 5,612,531 A | 3/1997 | Barkan et al. | |
| 5,705,799 A | 1/1998 | Li | |
| 5,811,782 A | 9/1998 | Sato et al. | |
| 5,852,286 A | 12/1998 | Coleman | |
| 5,923,023 A | 7/1999 | Arends et al. | |
| 5,925,868 A | 7/1999 | Arends et al. | |
| 5,949,054 A | 9/1999 | Karpen et al. | |
| 6,000,616 A | 12/1999 | Spitz | |
| 6,000,619 A * | 12/1999 | Reddersen et al. | 235/462.45 |

(Continued)

*Primary Examiner*—Edwyn Labaze
(74) *Attorney, Agent, or Firm*—Kevin D. Wills (57) ABSTRACT

Briefly, in accordance with one or more embodiments, a scanner system may scan a target based on a first derivative of a reflectance profile received from a scanned target. Positive and negative threshold values may comprise a static portion and a dynamic portion. The static portion may comprise a constant value, and the dynamic portion may be based at lest in part on a charge profile, or a discharge profile, of a capacitor. The threshold for generating the digital signal may be set lower when the amplitude of the first derivative is lower, and higher when the amplitude of the first derivative is higher.

4 Claims, 7 Drawing Sheets

U.S. PATENT DOCUMENTS

| | | |
|---|---|---|
| 6,073,849 A | 6/2000 | Colley et al. |
| 6,155,490 A | 12/2000 | Ackley |
| 6,189,794 B1 | 2/2001 | Iwaguchi et al. |
| 6,343,741 B1 | 2/2002 | Arends et al. |
| 6,382,511 B1 | 5/2002 | Tang et al. |
| 6,502,751 B1 | 1/2003 | Tang |
| 6,874,688 B1 | 4/2005 | Barkan et al. |
| 6,938,824 B2 | 9/2005 | Madej et al. |
| 7,148,591 B2 | 12/2006 | Mizoguchi et al. |
| 7,628,331 B2 * | 12/2009 | Madej .................. 235/462.32 |
| 2003/0053232 A1 | 3/2003 | Dalziel |
| 2004/0035933 A1 * | 2/2004 | Havens et al. ............... 235/454 |
| 2008/0197198 A1 * | 8/2008 | Barkan .................. 235/462.36 |

* cited by examiner

BAR CODE SCANNER HAVING AN ADAPTIVE THRESHOLD USING A FIRST DERIVATIVE AMPLITUDE

BACKGROUND

A scanner system for scanning targets such as bar codes detect the light reflected back from the bar code and process the reflected light signal to determine the time position of the black to white and the white to black transitions between the symbols of the bar code. The signal strength of the reflected light signal will vary across the field of view (FOV) of the scanner system due to the geometry of the scanner mechanism, positioning of the bar code, receiving system gain versus angle, and ambient light intensity. Generally, the scanner system should maximize the sensitivity of the scanner system while still rejecting high levels of noise. To achieve this, typical scanner systems utilize zero crossings of the second derivative of the reflected signal to detect black to white and white to black transitions. However, using a second derivative of the reflected signal is computationally complex and therefore involves more circuitry or processing power.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
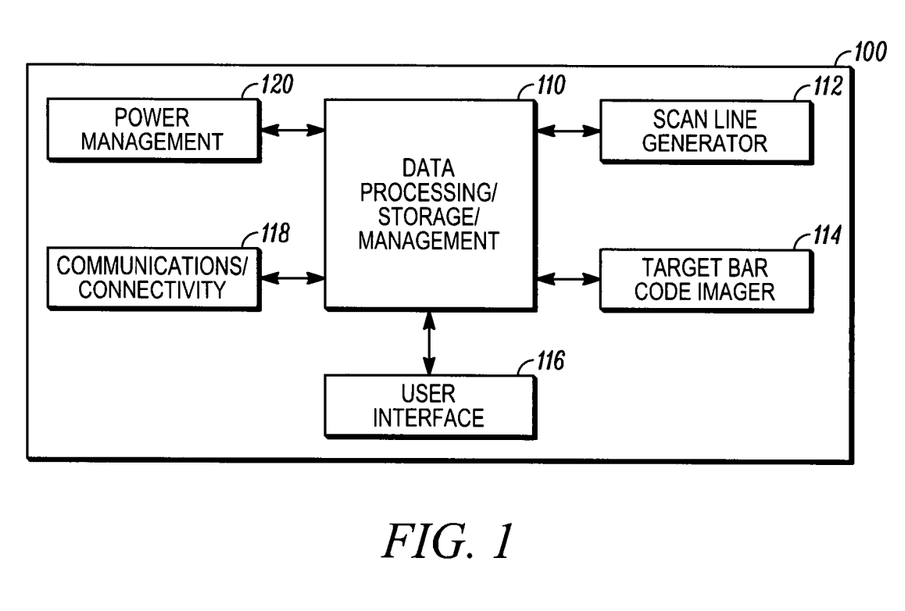
FIG. 1 is a block diagram of a MEMS device for a scanner system in accordance with one or more embodiments.

Referring now to FIG. 1, a block diagram of a MEMS based scanner system in accordance with one or more embodiments will be discussed. As shown in FIG. 1, scanner system 100 may comprise a data processing, storage, and management block (DATA PROCESSING/STORAGE/MANAGEMENT) 110. In general, the data processing, storage, and management block may be referred to as processor 110. Processor 110 may send control signals to scan line generator (SCAN LINE GENERATOR) block 112 to cause scan line generator 112 to generate a laser beam swept across a target such as a bar code in a generally linear sweep across the target. In one or more embodiments, scan line generator 112 may generate a linear sweep scan line in one dimension, for example to read a one-dimensional type bar code, and in one or more alternative embodiments, scan line generator 112 may generate a non-linear sweep scan, and/or or a scan along two scan lines that may be orthogonal to one another, and/or non-orthogonal in some embodiments, for example to read a two-dimensional type bar code or other code or symbol, although the scope of the claimed subject matter is not limited in these respects. In general, a sweep scan may also refer to a sweep range or a scan angle.

Scanner system 100 may comprise a target bar code imager 114 that is capable of capturing light emitted from scan line generator 112 that is reflected off of the target bar code as a reflectance profile of the target to convert the reflectance profile into an electrical signal representative of information stored in the target bar code. Target bar code imager 114 then sends the reflectance profile signal to processor 110 for decoding of the information stored in the target bar code.

In one or more embodiments, scanner system 100 may further include a user interface 116 capable of allowing a user to control scanner system 100. For example, user interface 116 may include one or more buttons or other actuators to cause scan line generator 112 emit the scan line to capture the target bar code. User interface 116 optionally may include devices for indicating to a user that a target bar code was successfully scanned, for example one or more lights, displays, speakers, and so on, and/or to provide other operational information to the user to assist the user in operating scanning system 100.

In addition, scanning system 100 may include a communications/connectivity block 118 that includes circuits for allowing scanning system 100 to connect to one or more other devices, for example to send information obtained from scanned targets to remote devices such as a computer, server, and/or other type of information handling system. Furthermore, communications/connectivity block 118 may provide one or more interfaces capable of allowing scanning system 100 to be utilized in conjunction with such other devices, for example such another device may comprise a point of sale (POS) terminal that may utilize scanning system 100 to capture target bar codes disposed on goods sold by a user operating the POS terminal. Furthermore, communications/connectivity block 118 may include various interfaces to allow scanning system 100 to be updated with new programs or software to be stored in and/or executed by processor 110. Communications/connectivity block 118 optionally may include one or more wireless communication systems to allow scanning system 100 to communicate with one or more remote devices via a wireless communication link. Such wireless communication links may comprise, for example, an infrared type communication link, a Bluetooth type communication link, an Institute of Electrical and Electronics Engineers (IEEE) 802.11a/b/g/n type communication link, a broadband type communication link such as a Third Generation Partnership Project (3GPP) type cellular communication link or a Wireless Interoperability for Microwave Access (WiMAX) type communication link, and so on, although the scope of the claimed subject matter is not limited in these respects. In addition, scanning system 100 may include a power management block 120 that is capable of controlling and/or managing the operational power utilized by scanning system. For example, power management block 120 may power down scan line generator 112 when target bar codes are not being captured after a predetermined period of time to conserve power such as when scanning system 100 is being powered by a battery.

Figure 2:
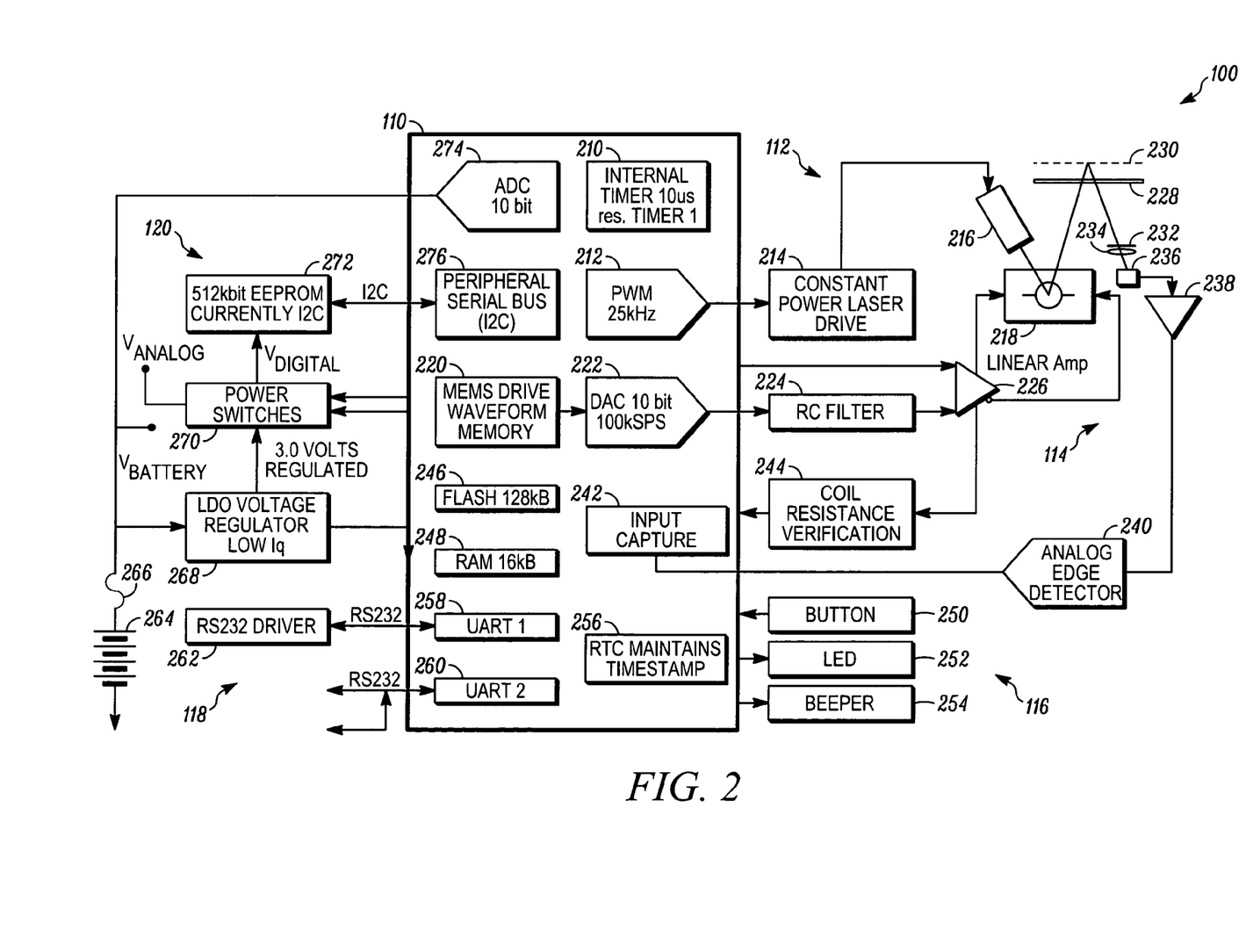
FIG. 2 is a block diagram of a MEMS device showing subcomponents of the scanner system in accordance with one or more embodiments.

Referring now to FIG. 2, a block diagram of a MEMS based scanner showing subcomponents of the scanner system in accordance with one or more embodiments will be discussed. The diagram shown in FIG. 2 is one particular embodiment of scanning system 100 of FIG. 1. However, other variations of the particular subcomponents of scanning system 100 may be utilized, including more or fewer components, or substitute or alternative components, and the scope of the claimed subject matter is not limited in these respects. As shown in FIG. 2, scanning system 100 generally corresponds to one particular embodiment of scanning system 100 of FIG. 1, including processor 110, scan line generator 112, target bar code imager 114, user interface 116, communications/connectivity block 118, and/or power management block 120. Processor 110 may comprise an internal timer 210 to provide a timing reference for scanning system 100. In one or more embodiments, the period of the timing reference may comprise 10 microseconds, although the scope of the claimed subject matter is not limited in this respect. A pulse width modulator 212 may generate a pulse signal to constant power laser drive 214 to provide a signal for driving laser 216. In response to the driving signal received from constant power laser drive 214, laser 216 may emit a beam of laser light that impinges upon a reflector of microelectromechanical system (MEMS) scanner 218. MEMS device 218 is caused to oscillate and/or otherwise move in a desired pattern to cause the reflected laser beam emitted from laser 216 to sweep across a target 230 for capturing and decoding of the target 230. In one or more embodiments, memory 220 may contain values for a waveform with which MEMS device 218 is driven to cause the laser beam to sweep in a desired or predetermined pattern across target 230. The waveform stored in memory 220 may comprise digital values of the waveform for a given period of the waveform that may be converted to an analog signal via digital-to-analog converter (DAC) 222 and filtered with a reconstruction filter 224 to provide a smoother waveform to drive MEMS device 218. In one or more embodiments, the waveform stored in memory 220 may comprise a generally sinusoidal type waveform stored with 10 bits of quantization levels, and DAC 222 may comprise a 10 bit digital-to-analog converter operating at 100 kilosamples per second. Reconstruction filter 224 may comprise a resistor-capacitor type low pass filter capable of removing harmonics from the waveform above the fundamental frequency of the waveform stored in memory 220 to provide a generally smoother waveform to linear amplifier 226 that provides the driving signal to MEMS device 218.

In one or more embodiments, laser light is emitted from laser 216 to onto MEMS device 218 which in turn reflects the laser light onto target 230 in a pattern determined by the waveform stored in memory 222. The laser light is passed through window 228 and reflected off of target 230 back into window 228 of scanning system 100. Window 228 may provide some filtering of ambient light to assist in capturing light reflected off of target 230 without capturing ambient light or other optical noise that may be present in the environment in which scanning system 100 may be operated. Captured light may be further filtered via filter 232 and focused with lens 234 onto an optical detector 236 that may comprise, for example, a positive-intrinsic-negative (PIN) diode or the like. Light impinging on light detector may modulate a current that is amplified by amplifier 238, which may provide preamplification type functions and/or bandpass filter type functions to provide an electrical signal representative of the reflectance profile of light reflected off of target 230 onto optical detector 236. The output of amplifier 238 may then be provided to analog edge detector 240 for detecting edge transitions in electrical signal that correspond, for example, to the edges of bars or other symbols in target code 230. The output of analog edge detector 240 may then be provided to an input capture block 242 of processor 110 for decoding of the signal based on the output of analog edge detector 240. For example, the times between edges detected by analog edge detector 240 may correspond to the widths of the bars in the bar code of target 230, which in turn may correspond to data encoded in the bar code from which the data may be extracted. The resulting decoded signal may be stored, at least temporarily, in a non-volatile memory such as flash memory 246 and/or in a volatile type memory such as random access memory (RAM) 248. Furthermore, programs, software, and/or other data may be stored in flash memory 246 and/or RAM 248. A real time clock (RTC) 256 may be utilized to provide a time reference for processor 110 that may be utilized, for example, to timestamp a scanned barcode or other piece of data. In one or more embodiments, a coil resistance verification circuit 244 may be utilized to detect whether the coil of MEMS device 218 has failed and is an open circuit or a short circuit, or whether the coil resistance is within a normal range. In the event coil resistance verification circuit 244 detects an open circuit and/or a short circuit in the coil of MEMS device 218, processor 110 may shut off power to laser 216, for example for safety purposes, although the scope of the claimed subject matter is not limited in these respects.

In one or more embodiments, user interface 116 may comprise a button 250 that may be used by a user to actuate scanning of target 230 by scanning system 100. For example, in response to a user actuating button 250, processor 110 may turn on power to laser 216. A light such as light emitting diode (LED) 252 may be used to provide a visual indication to the user that scanning system 100 is operating and attempting to capture a target 230, and/or that the attempted capture of the target has failed and/or has been successful. Furthermore, user interface 116 may include a beeper 254 which may comprise a speaker or other device capable of generating and audible signal, which may likewise indicate to a user that the that scanning system 100 is operating and attempting to capture a target 230, and/or that the attempted capture of the target has failed and/or has been successful. Various combinations of light pulses, light flashed, solid illumination, and/or tones may be utilized to provide combinations of feedback to the user concerning the operation of scanning system 100 and/or the capturing of a target 230 by scanning system 100. Optionally, user interface 116 may include a display capable of providing more advanced and/or more detailed information to the user pertaining to the operation of scanning system and/or the capturing of a target 230 by scanning system 100, although the scope of the claimed subject matter is not limited in this respect.

In one or more embodiments, communications/connectivity block 118 may comprise a first universal asynchronous receiver-transmitter (UART) 258 for handling serial type communications and/or a second UART 260. UART 258 may couple to a recommended standard-232 (RS-232) driver 262 to couple scanning system 100 to remote devices via an RS-232 type interface. UART 260 may likewise couple to remote devices using a serial type interface such as RS-232. UART 258 and/or UART 260 may further couple to one or more remote devices using various other types of communication interfaces such as Bluetooth, IEEE 802.11a/b/g/n, and so on. In one or more embodiments, RS 232 driver 262 may couple to a stereo jack such as a one-eighth inch stereo jack to couple scanning system 100 to one or more other devices during operation of scanning system 100, for example to implement a tethered mode of operation. In one or more embodiments, UART 260 may couple to a remote device or computer for performing debugging or the like type operations for scanning system 100. However, these are merely example types of communication systems and/or interfaces for scanning system 100, and the scope of the claimed subject matter is not limited in these respects.

In one or more embodiments, power management block 120 of scanning system 100 may include a power source such as battery 264, which may optionally include a serially connected fuse 266, to provide an operational voltage for scanning system 100. The battery voltage ($V_{BATTERY}$) of battery 264 may be provided to voltage regulator 268 to provide a regulated operational voltage to scanning system 100. One or more power switches 270 may be coupled to voltage regulator 268 for powering scanning system 100 on or off. Power switches 270 may provide a first voltage level ($V_{ANALOG}$) to power analog devices of scanning system 100 at an appropriate voltage for such analog circuits, and/or may provide a second voltage level ($V_{DIGITAL}$) to power digital devices of scanning system 100 at an appropriate voltage for such digital devices. The battery voltage from battery 264 may also be provided to an analog-to-digital converter (ADC) 274, which may comprise a 10 bit converter, to provide a voltage reference signal to processor 110 which may monitor the output voltage of battery 264, for example to indicate to the user that the charge on battery 264 is sufficient for operating scanning system 100, or to indicate to the user that the charge on battery 264 is low and should be recharged. Processor 110 may include a peripheral serial bus 276 to couple to an electrically erasable program read only memory (EEPROM) 272 capable of being utilized for storing data from one or more decoded targets for example in a batch mode, and/or for storing programs and/or data capable of being executed by processor 110, for example to control the operation of scanning system 100, although the scope of the claimed subject matter is not limited in these respects.

Figure 3:
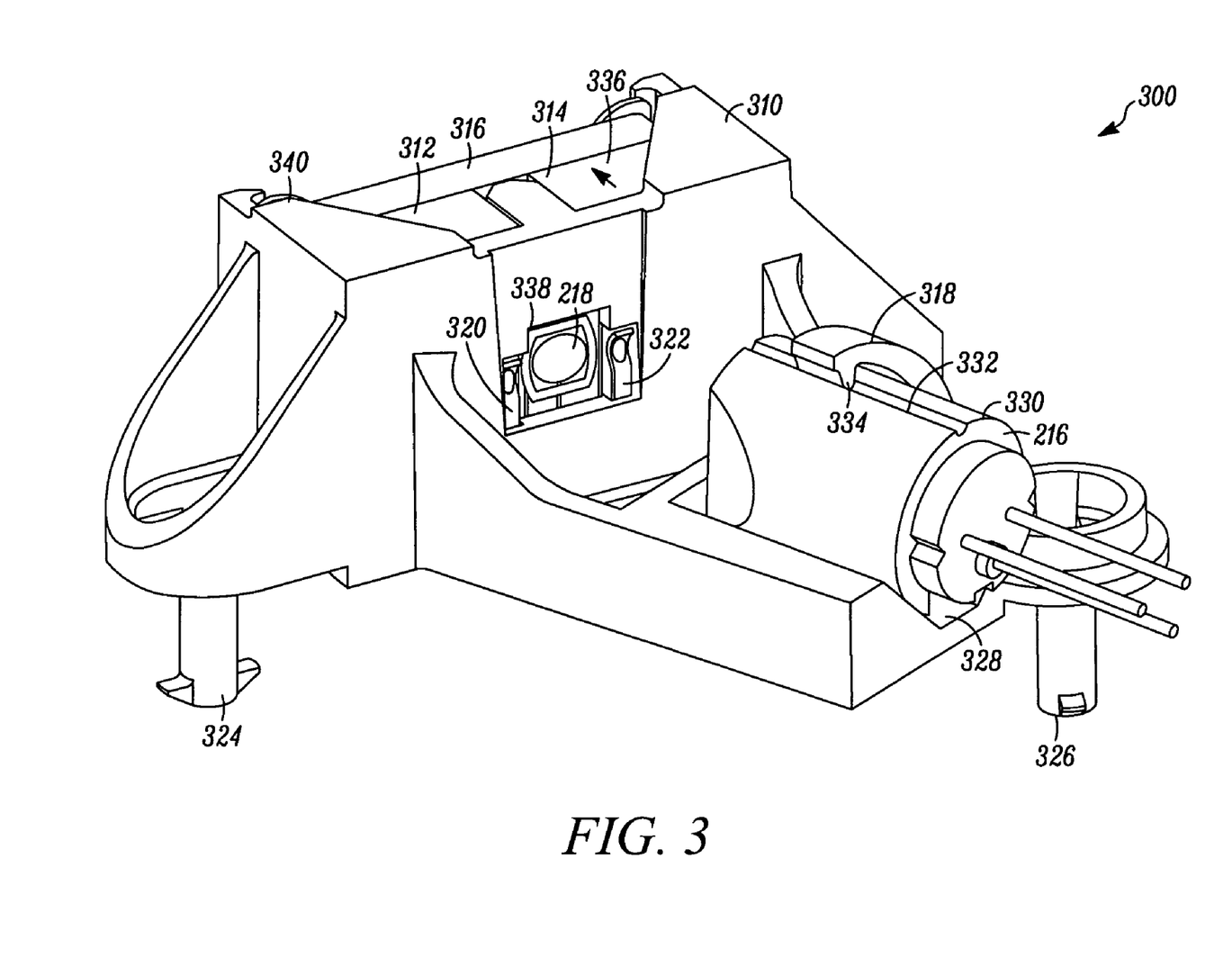
FIG. 3 is a perspective diagram of a scanning module of a scanner system in accordance with one or more embodiments.

Referring now to FIG. 3, a perspective diagram of a MEMS based laser scanning module of a MEMS based scanner system in accordance with one or more embodiments will be discussed. As shown in FIG. 3, scanning module 300 may comprise a frame 310 into which various components of scan line generator 112 may be disposed. In one or more embodiments, frame 310 may comprise a unitary structure comprising a molded plastic or the like. Frame 310 may comprise a first section 328 into which laser 216 may be inserted and fastened in place via snap arm 318. Laser 216 may comprise a transistor outline (TO) can type device inserted into a cylindrical cover 330 having a slot or groove 332 into which a tab 334 of snap arm 318 may fit to hold laser 216 in place within first section 328. First section 328 may be further sized and/or shaped to contain laser 216 and restrict the lateral and/or longitudinal movement of laser 216 within first section 328. Such an arrangement of laser 216 and/or first section 328 may function to allow ease of insertion and/or removal of laser 216 into first section 328 of frame 310, and further to provide physical alignment of laser 216 such that a laser beam emitted from laser 216 may impinge upon MEMS device 218. Likewise, frame 310 may include second section 336 into which MEMS device 218 may be disposed and held within a proper alignment in second section 336 so that the laser beam emitted from laser 216 may impinge upon MEMS device 218 through window 338 formed in frame 310. Second section 336 may have a size and/or shape to allow magnet 312 and magnet 314 to be placed adjacent to MEMS device 218 and to further receive field plate 316 adjacent to and coupled with magnets 312 and 314. In addition, spring clip 340 may provide a bias force against field plate 316 to further secure field plate 316, magnets 312 and 314, and MEMS device 218 within second section 336. Contacts 320 and 322 may couple to the coil of MEMS device 218 to provide electrical contact with the coil and one or more contacts on a circuit board (not shown) onto which scanning module 300 may be placed within a housing of scanning system 100. Contacts 320 and 322 may be physically biased against corresponding contacts on MEMS device 218 to maintain physical and electrical contact with MEMS device 218 so that a mirror driving signal may be provided to MEMS device 218.

Such an arrangement of first section 328 and/or second section 336 may facilitate assembly of the components of scanning module 300 into frame 310 such that the components of scanning module 300 may be easily inserted into frame 310 without requiring additional alignment of the components such as laser 216 and/or MEMS device 218 after placement into frame 310. The tolerances with which frame 310 is manufactured may be sufficient to allow such assembly of scanning module 300 without requiring additional physical and/or electrical alignment of either laser 216 and/or scanning module 218. Frame 310 may further comprise one or more posts 324 and 326 having corresponding structures such as tabs to allow scanning module 300 to be attached to the circuit board (not shown) of scanning system 100 in a position with respect to window 228 as shown in FIG. 1 to allow for a range of motion for the sweep of the laser beam out of window 228 and to allow the laser beam reflected off of target 230 to enter back into the housing of scanning system 100 through window 228 to be detected by optical detector 236, although the scope of the claimed subject matter is not limited in these respects. It should be noted that although scanning module 300 of FIG. 3 pertains to a MEMS based scanning module for scanning system 100, scanning module 300 may be adapted to a MEMS based display module having a MEMS scanning rasterizer for generating a display from the laser light emitted from one or more lasers in a suitable arrangement to display an image projected onto a surface, in a display region such as in a head up display, and/or as an image projected onto a retina of a user, as a few of several examples, and the scope of the claimed subject matter is not limited in these respects.

Figure 4:
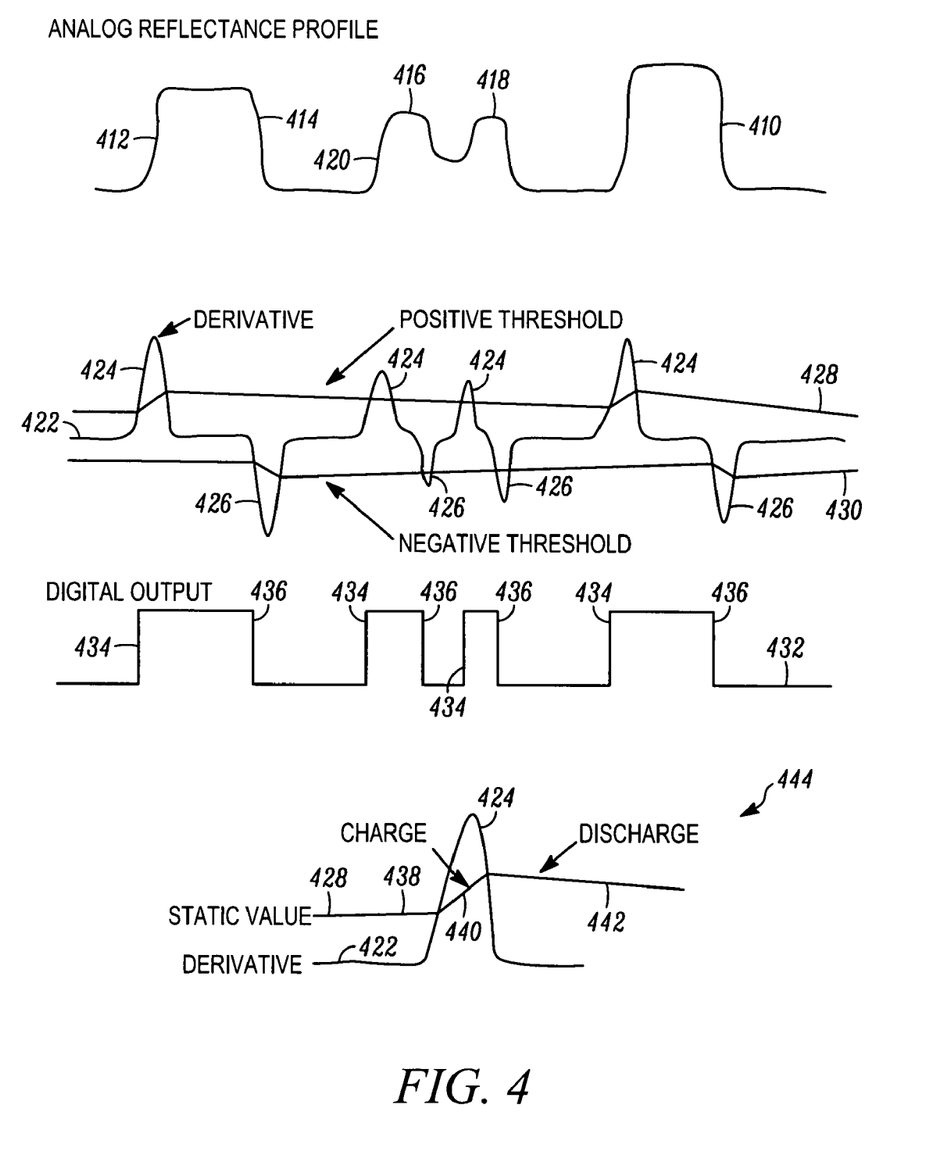
FIG. 4 is a diagram of scanning waveforms illustrating an adaptive threshold using a first derivative amplitude in accordance with one or more embodiments.

Referring now to FIG. 4, a diagram of scanning waveforms illustrating an adaptive threshold using a first derivative amplitude in accordance with one or more embodiments will be discussed. An analog reflectance profile 410 is shown in FIG. 4 that is generally representative of the varying patterns of black bars and white spaces of target 230 where target 230 may comprise a linear bar code. Analog reflectance profile 410 represents the output from optical detector 236 as output by amplifier 238 to analog edge detector 240. In one or more embodiments, peaks such as peaks 416 and 418 correspond to white spaces of target 230. The width of a peak may be representative of the widths of the black bars or the spaces between two adjacent back bars. For example, the width between edge 412 and edge 414 may be representative of a white space between two adjacent bars, since the reflectivity of a white space is higher than the reflectivity of a black bar resulting in a higher signal output. Likewise, the width between edge 414 and edge 420 may be representative of a width of a black bar. By measuring the timing between the edges of analog reflectance profile 410, and knowing if an edge is a rising edge or a falling edge, information in target 230 may be decoded.

The first derivative signal 422 is representative of a first derivative of analog reflectance profile 410. Positive peaks 424 of first derivative signal 422 are representative of rising edges in analog reflectance profile 410 where the slope of analog reflectance profile 410 is positively valued. Likewise, negative peaks 426 of first derivative signal 422 are representative of falling edges in reflectance profile 410 where the slope of analog reflectance profile 410 is negatively valued. Edges of the black bars of target 230 may be detected when peaks such as 424 or 426 are greater than a positive threshold 428 or less than a negative threshold 430. Thus, in one or more embodiments, a transition from a black bar to a white space of target 230 may occur when a positive peak 424 of the first derivative signal 422 exceeds positive threshold 428, and a transition from a white space to a black bar of target 230 may occur when a negative peak 426 of the first derivative signal falls below negative threshold 430. As can be seen in FIG. 4, positive threshold 428 and/or negative threshold 430 are not set to a constant value. Instead positive threshold 428 and/or negative threshold comprise a constant value plus a non-constant value that changes over time. The non-constant value portion of positive threshold 428 and/or negative threshold 430 may be referred to as the dynamic portion of the threshold. Analog edge detector 240 may detect edges of analog reflectance profile based 410 to generate a digital output signal 432 based at least in part on positive threshold value 428 and/or negative threshold value 430. For example, analog edge detector 240 may generate rising edges 434 in digital output signal 432 when positive peaks 424 of first derivative signal 422 exceed positive threshold 428, and may generate falling edges 436 in digital output signal 432 when negative peaks 426 of first derivative signal 422 fall below negative threshold value 430. Digital output signal 432 may then be provided to processor 110 to be decoded and the information stored in target 230 may be obtained. As can be seen at 444 as an example, positive threshold 428 may comprise a first, static value 438. The value of positive threshold 428 may vary over time to be adaptive to the values of the first derivative signal 422. In one or more embodiments, the value of positive threshold 428 may be lower when the amplitude of first derivate signal 422 is lower valued. In one embodiment, the lower value of positive threshold 428 may comprise just the static value 428. When the threshold value is lower, the sensitivity of scanner system 100 may be greater. In one or more embodiments, the value of positive threshold 428 may be higher when the amplitude of first derivative 422 signal is higher valued. To increase the threshold value, a capacitor may be charged and capacitor voltage when charging 440 may be added to static value 438 of positive threshold 428. After the capacitor has charged to a predetermined value, the capacitor may be discharged such that the value of positive threshold 428 may decrease the capacitor voltage when discharging 442 may decrease over time. Such an adaptive threshold may likewise be provided for negative peaks 426 and negative threshold 430 for first derivative signal 422 for negative values of first derivative signal 422. In one or more embodiments, positive threshold hold value 428 include the positive static value 428, charge voltage 440 and rate, and/or discharge voltage 442 and rate may be set independently for positive peaks 424 and negative peaks of first derivative signal 422, for example by selective differing values for the capacitors and resistors utilized to generate charging voltages 440 and/or discharge voltage 442. In such an arrangement, the charge and discharge rate for such capacitors may be fine tuned to account for geometry of scanner system 100 and/or MEMS device 218, gain of optical detector 236 as a function of scan angle, and/or the position or orientation of target 230 within the field of view of scanner system 100. However, these are merely examples of how to provide a variable scanning threshold value and optimization of scanning, and the scope of the claimed subject matter is not limited in these respects.

Figure 5:
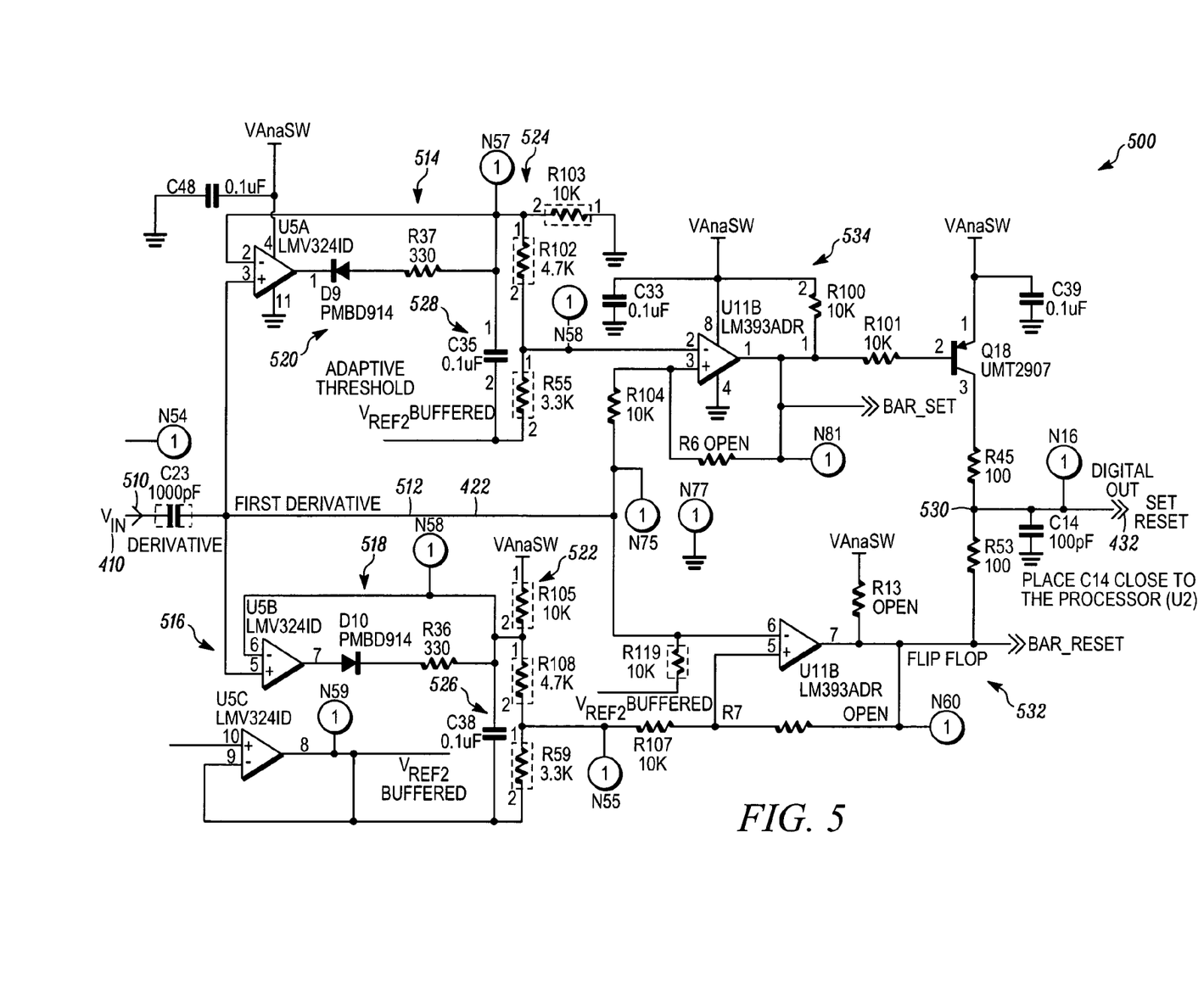
FIG. 5 is a diagram of a circuit for a scanner system capable of scanning targets based at least in part on an adaptive threshold using a first derivative amplitude in accordance with one or more embodiments.

Referring now to FIG. 5, a diagram of a circuit for a scanner system capable of scanning targets based at least in part on an adaptive threshold using a first derivative amplitude in accordance with one or more embodiments will be discussed. As shown in FIG. 5, circuit 500 may be utilized to provide a digital output signal 432 at node 530 in response to receiving analog reflectance profile 410 at input node 510. It should be noted that circuit 500 of FIG. 5 may correspond to a tangible embodiment of analog edge detector 240 of FIG. 2. Capacitor C23 coupled in series between node 510 and node 512 may be utilized to convert analog reflectance profile 412 into first derivative signal 422 at node 512. The negative portion of first derivative signal 422 may be processed by adaptive threshold circuit 514, and the positive portion of first derivative signal 422 may be processed by adaptive threshold circuit 516. The positive portion of first derivative signal 422 may be passed through peak detector circuit 518 to detect positive peaks 424 of first derivative signal 422 and ignore negative peaks 426. Likewise, the negative portion of first derivative signal 422 may be passed through peak detector circuit 520 to detect negative peaks 426 of first derivative signal 422 and ignore positive peaks 424. The static threshold value 428 may be set by voltage divider network 522 for positive swings, and by voltage divider network 524 for negative swings. Thus, the static threshold value may be set by resistors R105, R108 and R59 at node N55 for positive swings, and the static threshold value may be set by resistors R103, R102 and R 55 at node 58 for negative swings. The dynamic portion of the threshold values for positive swings may be set by a resistor-capacitor network 526 comprising resistors R108 and R59 in combination with capacitor C38, and the dynamic portion of the threshold values for negative swings may be set by resistor-capacitor network 528 comprising resistors R102 and R55 in combination with capacitor C35. Positive peaks 424 of the first derivate signal 422 that exceed the positive threshold value 428 may trigger flip-flop circuit 532, and negative peaks of the first derivative signal 422 that fall below negative threshold value 430 may trigger flip-flop circuit 534. The outputs of flip-flop circuits 532 and 534 are then combined at node 530 to generate digital output circuit 432. However, circuit 500 is merely one example implementation of a circuit for a scanner system capable of scanning targets based at least in part on an adaptive threshold using a first derivative amplitude, wherein other circuits or variations on circuit 500 may also be utilized, and the scope of the claimed subject matter is not limited in this respect.

Figure 6:
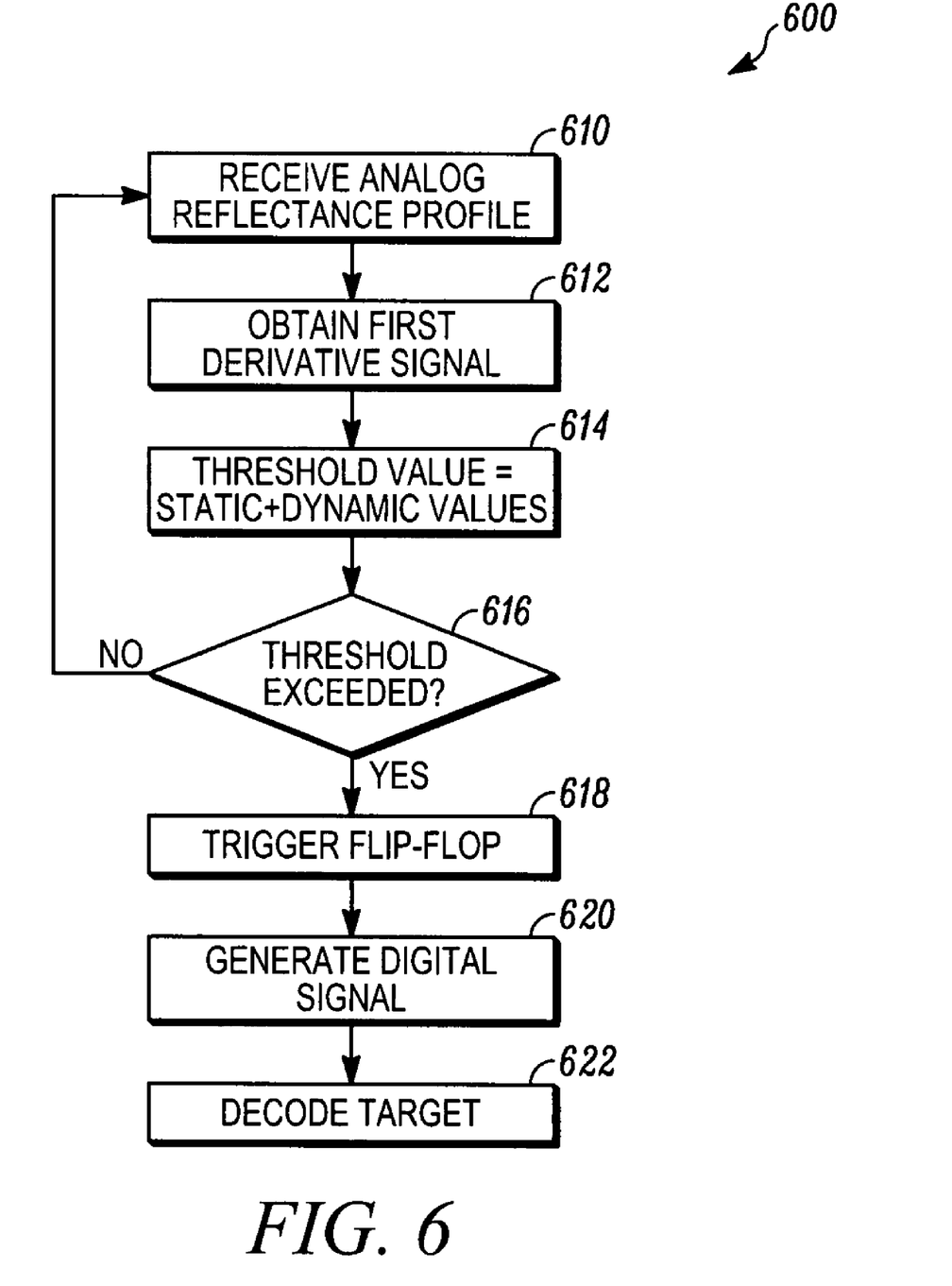
FIG. 6 is a flow diagram of a method for scanning targets based at least in part on an adaptive threshold using a first derivative amplitude in accordance with one more embodiment.

Referring now to FIG. 6, a flow diagram of a method for scanning targets based at least in part on an adaptive threshold using a first derivative amplitude in accordance with one more embodiment will be discussed. FIG. 6 shows one particular order of blocks 610 through 622 for method 600, however other orders may also be utilized, with more or fewer blocks than shown in FIG. 6, and the scope of the claimed subject matter is not limited in these respects. As shown in FIG. 6, an analog reflectance profile 410 from a scanned target 230 may be received at block 610, and the first derivative signal 422 of the analog reflectance profile 410 may be obtained at block 612. A threshold value for generating a digital signal 432 based at least in part on detected peaks 424 and 426 of the first derivate signal 422 may be comprise a static portion 438 and a dynamic portion 440 and 442 as set at block 614. A determination may be made at block 616 whether the magnitudes of the peaks 424 and 426 of the first derivate signal 422 exceed the magnitudes of the positive threshold value 428 or the negative threshold value 420. If the threshold values are not exceeded, method 600 may continue at block 610 to continue to receive the analog reflectance profile 410 until the threshold value or values are exceeded, or until no further analog reflectance profile 610 is received. In the event a magnitude of the threshold value is exceeded by a magnitude of a peak value of the analog reflectance profile 410, a corresponding flip-flop circuit 532 or 534 may be triggered at block 618, and digital signal 432 may be generated from the outputs of flip-flop circuits 532 and/or 534. The target 230 may then be decoded at block 622 based at least in part on the digital signal 432 generated at block 620. It should be noted that method 600 embodies one particular method for a scanner system capable of scanning targets based at least in part on an adaptive threshold using a first derivative amplitude, wherein other methods may alternatively be implemented, and the scope of the claimed subject matter is not limited in this respect.

Figure 7:
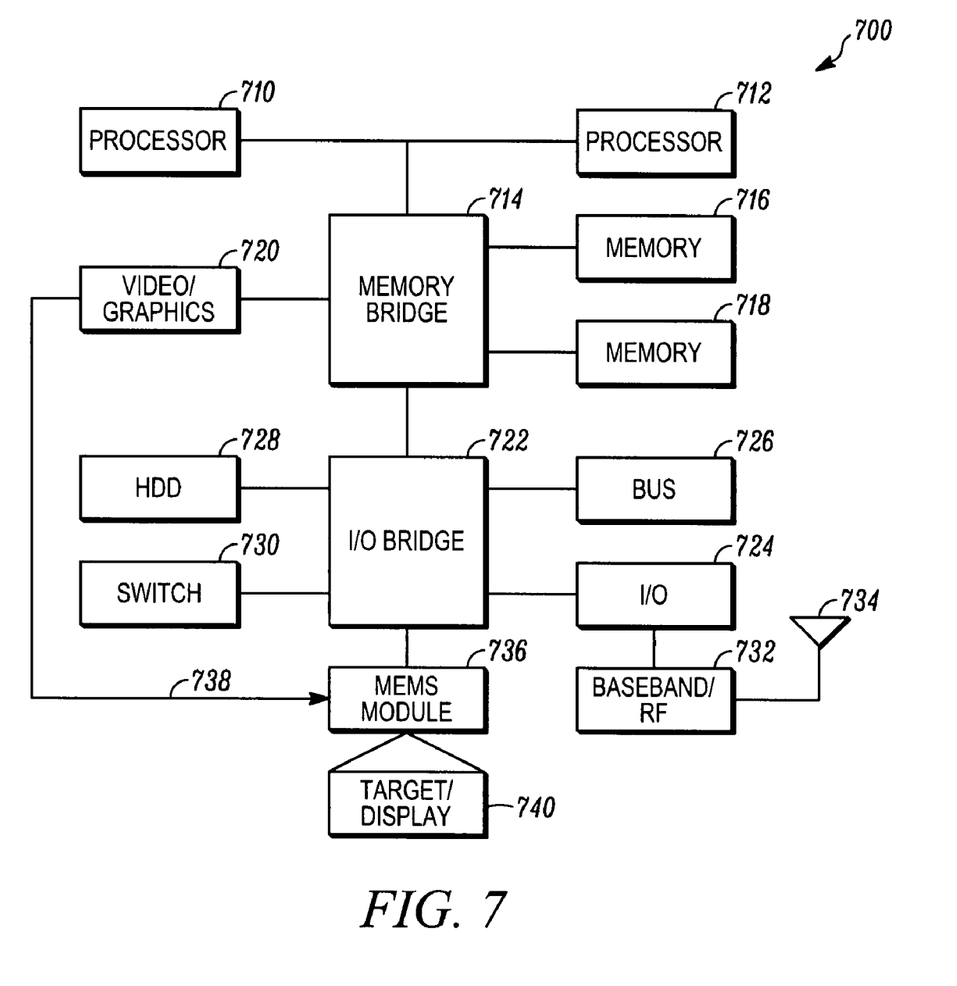
FIG. 7 is a block diagram of an information handling system capable of utilizing a scanner system or the like in accordance with one or more embodiments.

Referring now to FIG. 7, a block diagram of an information handling system capable of utilizing a MEMS based scan engine for an image scanner or the like in accordance with one or more embodiments will be discussed. Information handling system 700 of FIG. 7 may tangibly embody scanner system 100 as shown in and described with respect to FIG. 1. Although information handling system 700 represents one example of several types of computing platforms, information handling system 700 may include more or fewer elements and/or different arrangements of elements than shown in FIG. 7, and the scope of the claimed subject matter is not limited in these respects.

Information handling system 700 may comprise one or more processors such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor based memory, for example volatile type memory and/or non-volatile type memory. Memory bridge 714 may couple to a video/graphics system 720 to drive a display device, which may comprise MEMS module 736, coupled to information handling system 700.

Information handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 700. Bus system 726 may comprise one or more bus systems such as a peripheral component interconnect (PCI) express type bus or the like, to connect one or more peripheral devices to information handling system 700. A hard disk drive (HDD) controller system 728 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. Furthermore, as shown in FIG. 7, information handling system 700 may include a baseband and radio-frequency (RF) block 732 comprising a base band processor and/or RF circuits and devices for wireless communication with other wireless communication devices and/or via wireless networks via antenna 734, although the scope of the claimed subject matter is not limited in these respects.

In one or more embodiments, information handling system 700 may include a MEMS module 736 that may correspond to scanning module 300 of FIG. 3 and which may include any one or more components of scanner system 100 such as processor 110, scan line generator 112, target bar code imager 114, user interface 116, communications/connectivity block 118, and/or power management block 120. In one or more embodiments, MEMS module 736 may be controlled by one or more of processors 710 and/or 712 to implements some or all of the functions of processor 110 of FIG. 1. MEMS module 736 may include MEMS device 218 as shown in and described with respect to FIG. 2 through FIG. 3, for example, which may be utilized to implement a scanner system capable of scanning targets based at least in part on an adaptive threshold using a first derivative amplitude as shown in and described with respect to FIG. 4 through FIG. 6. In one or more embodiments, MEMS module 736 may comprise a scanner for scanning target 230 such as a bar code represented by target/display 740, and/or may comprise a MEMS based display for displaying an image projected by MEMS module 736 where the image may likewise be represented by target/display 740. In one or more embodiments, a scanned beam display engine may comprise video/graphics block 720 having a video controller to provide video information 738 to MEMS module 736 to display an image represented by target/ display 740. In one or more embodiments, such a MEMS module 736 may include MEMS device 218 as described herein. In particular embodiments, MEMS device 218 may comprise a biaxial mirror system wherein a mirror of MEMS device 218 may reflect a beam from laser 216 in two dimensions to generate a two-dimensional image. However, these are merely example implementations for MEMS module 736 within information handling system 700, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a bar code scanner having an adaptive threshold using a first derivative amplitude and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
a laser to emit a beam of light;
a mirror to reflect the beam of light emitted by the laser:
a scan line generator circuit to provide a drive signal to the mirror to move the mirror and direct the reflected beam of light in a motion responsive to the drive signal to scan a target; and
a circuit to generate a first derivate signal of a reflectance profile received from the scanned target;
wherein the circuit is capable of generating a digital signal representative of the scanned target based at least in part on an adaptive threshold applied to the first derivative signal, and wherein the adaptive threshold having a magnitude that is set to a lower value when a magnitude of the first derivative signal is lower valued, and the adaptive threshold having a magnitude that is set to a higher value when a magnitude of the first derivative signal is higher valued.

2. A scanned beam display engine, comprising:
a video controller; and
a MEMS module capable of being controlled by said video controller to display an image, said MEMS module comprising:
a laser to emit a beam of light;
a mirror to reflect the beam of light emitted by the laser:
a scan line generator circuit to provide a drive signal to the mirror to move the mirror and direct the reflected beam of light in a motion responsive to the drive signal to scan a target; and
a circuit to generate a first derivate signal of a reflectance profile received from the scanned target;
wherein the circuit is capable of generating a digital signal representative of the scanned target based at least in part on an adaptive threshold applied to the first derivative signal, wherein the adaptive threshold having a magnitude that is set to a lower value when a magnitude of the first derivative signal is lower valued, and the adaptive threshold having a magnitude that is set to a higher value when a magnitude of the first derivative signal is higher valued.

3. An information handling system, comprising:
a processor;
a memory coupled to said processor; and
a MEMS module capable of being controlled by said processor by a program stored in the memory, said MEMS module comprising:
a laser to emit a beam of light;
a mirror to reflect the beam of light emitted by the laser:
a scan line generator circuit to provide a drive signal to the mirror to move the mirror and direct the reflected beam of light in a motion responsive to the drive signal to scan a target; and
a circuit to generate a first derivate signal of a reflectance profile received from the scanned target;
wherein the circuit is capable of generating a digital signal representative of the scanned target based at least in part on an adaptive threshold applied to the first derivative signal, wherein the adaptive threshold having a magnitude that is set to a lower value when a magnitude of the first derivative signal is lower valued, and the adaptive threshold having a magnitude that is set to a higher value when a magnitude of the first derivative signal is higher valued.

4. A method, comprising:
emitting beam of light with a laser;
reflecting the beam of light emitted by the laser with a mirror;
generating a drive signal to move the mirror and direct the reflected beam of light in a motion responsive to the drive signal to scan a target;
generating a first derivate signal of a reflectance profile received from the scanned target
generating a digital signal representative of the scanned target based at least in part on an adaptive threshold applied to the first derivative signal; and
setting a magnitude of the adaptive threshold to a lower value when a magnitude of the first derivative signal is lower valued, and setting a magnitude of the adaptive threshold to a higher value when a magnitude of the first derivative signal is higher valued.

* * * * *